(12) United States Patent
Kasztelan et al.

(10) Patent No.: US 6,524,470 B1
(45) Date of Patent: Feb. 25, 2003

(54) CATALYST COMPRISING BETA ZEOLITE AND PROMOTER ELEMENT FOR HYDROCRACKING

(75) Inventors: Slavik Kasztelan, Rueil Malmaison (FR); Nathalie George-Marchal, Saint Genis Laval (FR); Eric Benazzi, Chatou (FR)

(73) Assignee: Institut Francais du Pétrole, Rueil-Malmaison (FR)

( * ) Notice: Subject to any disclaimer, the term of this patent is extended or adjusted under 35 U.S.C. 154(b) by 0 days.

(21) Appl. No.: 09/305,290

(22) Filed: May 5, 1999

(30) Foreign Application Priority Data

May 6, 1998 (FR) ............................................... 98 05737
May 6, 1998 (FR) ............................................... 98 05736

(51) Int. Cl.⁷ ............................. B01J 29/76; B01J 29/78
(52) U.S. Cl. .......................... 208/111.05; 208/111.01; 208/111.3; 208/111.35; 502/64; 502/66; 502/74; 502/73
(58) Field of Search ............................... 502/64, 66, 74, 502/73; 208/111.01, 111.05, 111.3, 111.35

(56) References Cited

U.S. PATENT DOCUMENTS

| | | | |
|---|---|---|---|
| 3,594,310 A | 7/1971 | Pollitzer ........................ 208/111 |
| 4,419,220 A | 12/1983 | LaPierre et al. ............. 208/111 |
| 4,568,655 A * | 2/1986 | Oleck et al. | |
| 4,777,157 A | 10/1988 | Koepke et al. ................ 502/66 |
| 4,871,445 A | 10/1989 | Koepke et al. ................ 208/89 |
| 4,906,599 A | 3/1990 | Cody et al. .................... 502/62 |
| 5,015,361 A | 5/1991 | Anthes et al. ................. 208/111 |
| 5,030,780 A * | 7/1991 | Ward et al. | |
| 5,290,429 A * | 3/1994 | Delaney et al. | |
| 5,393,409 A | 2/1995 | Jan et al. ....................... 208/108 |
| 5,409,595 A | 4/1995 | Harandi et al. ................ 208/60 |
| 5,520,799 A | 5/1996 | Brown et al. ................. 208/143 |
| 5,525,209 A | 6/1996 | Billon et al. ................... 208/59 |
| 5,710,085 A * | 1/1998 | Absil et al. | |
| 5,833,840 A * | 11/1998 | Absil et al. .................. 208/113 |
| 5,856,608 A * | 1/1999 | Wu et al. | |
| 5,972,832 A * | 10/1999 | Shi et al. | |
| 6,149,799 A * | 11/2000 | Raybaud et al. | |

FOREIGN PATENT DOCUMENTS

| | | |
|---|---|---|
| EP | 0 051 346 | 5/1982 |
| EP | 0 094 827 | 11/1983 |
| EP | 0 216 443 | 4/1987 |
| EP | 0 363 531 | 4/1990 |
| FR | 2 758 278 | 7/1998 |
| GB | 1 390 359 | 4/1975 |
| GB | 1493928 A * | 11/1977 |
| WO | 95/26928 | 10/1995 |

* cited by examiner

*Primary Examiner*—Stanley S. Silverman
*Assistant Examiner*—Christina Ildebrando
(74) *Attorney, Agent, or Firm*—Millen, White, Zelano & Branigan, P.C.

(57) ABSTRACT

A catalyst comprising, in weight % with respect to the total catalyst weight 0.1% to 60% (expressed as the % by weight of oxide) of at least one hydro-dehydrogenating metal selected from the group formed by group VIB and VIII metals; 0.1% to 99% of at least one amorphous or low crystallinity porous matrix; 0.1% to 99.7% of beta zeolite; 0.1% to 20% (expressed as the % by weight of oxide) of at least one promoter element selected from the group formed by boron, silicon and phosphorous; 0 to 20% of at least one halogen; 0 to 20% (expressed as the % by weight of oxide) of at least one group VIIB element, the catalyst being especially useful for cracking hydrocarbon feeds.

23 Claims, No Drawings

CATALYST COMPRISING BETA ZEOLITE AND PROMOTER ELEMENT FOR HYDROCRACKING

The present invention relates to a catalyst for use in converting hydrocarbon-containing feeds, in particular for hydrocracking hydrocarbon-containing feeds, said catalyst comprising at least one hydro-dehydrogenating metal, for example, selected from metals from group VIB and VIII (group 6 and groups 8, 9 and 10 in the new periodic table notation: Handbook of Chemistry and Physics, 76$^{th}$ edition, 1995–1996, inside front cover), at least one porous amorphous or low crystallinity matrix (generally an oxide) and at least one beta zeolite preferably dealuminated. The catalyst also contains at least one promoter element deposited on the catalyst and selected from the group formed by boron, silicon and phosphorous. The catalyst also optionally contains at least one group VIIA element (group 17, the halogens), in particular fluorine, and optionally at least one group VIIB element such as manganese, technetium or rhenium.

The present invention also relates to processes for preparing said catalyst, and to its use in converting hydrocarbon-containing feeds such as petroleum cuts and cuts from coal. In particular, the invention relates to hydrocracking hydrocarbon-containing feeds containing, for example, aromatic and/or olefinic and/or naphthenic and/or paraffinic compounds, said feeds possibly containing metals and/or nitrogen and/or oxygen and/or sulphur.

Hydrocracking is gaining in importance in refining as the need to convert heavy fractions into lighter fractions which can be upgraded as fuels increases. This results from the increasing demand for fuels. Such upgrading involves a relatively large reduction in the molecular weight of the heavy constituents which can, for example, be achieved through cracking reactions.

The catalytic hydrocracking process uses catalysts containing a hydrogenating, desulphurising and denitrogenating function provided by the active phase based on transition metals, and an acidic function, generally provided by the amorphous matrix or a zeolite, or a mixture thereof. A good hydrocracking catalyst will be constituted by a properly adjusted hydrogenating function and acidic function. Hydrocracking is used to treat feeds such as vacuum gas oils, atmospheric or vacuum residues, which may or may not be deasphalted. Hydrocracking can produce highly purified lighter cuts, i.e., with a low sulphur, nitrogen and metals content.

Increasing the activity and selectivity of hydrocracking catalysts is thus important. One means consists of acidifying the matrix without poisoning the activity of either the transition-metal based hydrogenating phase or the cracking activity of the zeolite-based acidic phase.

The catalyst of the invention comprises at least one beta zeolite which is at least partially in its hydrogen form. The term "beta zeolite" means zeolites with a BEA structure type as described in the "Atlas of Zeolite Structure Types", W. M. Meier, D. H. Olson and Ch. Baerlocher, 4$^{th}$ revised edition, 1996. Elsevier.

Normally, beta zeolites with a total silicon/aluminium (Si/Al) atomic ratio of more than about 10 are preferably used, more preferably beta zeolites with an Si/Al ratio in the range 10 to 200, and still more preferably in the range 10 to 150. These beta zeolites with the Si/Al ratios defined above can be obtained through synthesis preferably or by using any post-synthesis dealumination technique known to the skilled person.

Preferred dealuminated bêta zeolites show atomic ratios Si/Al in the range 10 to 100, advantageously 20 to 70 and referably 25 to 55.

The first (preferred) method, direct acid attack, comprises a first calcining step carried out in dry air, at a temperature which is generally in the range 450° C. to 550° C. which eliminates the organic structuring agent present in the micropores of the zeolite, followed by a step in which the zeolite is treated with an aqueous solution of a mineral acid such as $HNO_3$ or HCl or an organic acid such as $CH_3CO_2H$. This latter step can be repeated as many times as is necessary to obtain the desired degree of dealumination. Between these two steps, one or more ion exchange steps can be carried out using at least one $NH_4NO_3$ solution, to at least partially and preferably almost completely eliminate the alkaline cation, in particular sodium. Similarly, at the end of the direct acid attack dealumination step, one or more ion exchange steps may be carried out using at least one $NH_4NO_3$ solution to eliminate residual alkaline cations, in particular sodium.

In order to obtain the desired Si/Al ratio, the operating conditions must be correctly selected; the most critical parameters in this respect are the temperature of the treatment with the aqueous acid solution, the concentration of the latter, its nature, the ratio between the quantity of acid solution and the mass of the treated zeolite, the treatment period and the number of treatments carried out.

Dealumination can also be achieved using chemical dealuminating agents such as (by way of non exhausting examples) silicon tetrachloride ($SiCl_4$), ammonium hexafluorosilicate [$(NH_4)_2SiF_6$], and ethylenediaminetetraacetic acid (EDTA), including its mono and disodium forms. These reactants can be used in solution or in the gaseous phase, for example in the case of $SiCl_4$.

The second method, heat treatment (in particular using steam, by steaming)+acid attack, comprises firstly calcining in dry air at a temperature which is generally in the range 450° C. to 550° C. to eliminate the organic structuring agent no occluded in the micropores of the zeolite. The solid obtained then undergoes one or more ion exchanges using at least one $NH_4NO_3$ solution, to eliminate at least a portion, preferably practically all, of the alkaline cation, in particular sodium, present in the cationic position of the zeolite. The zeolite obtained then undergoes at least one framework dealumination cycle comprising at least one heat treatment which is optionally and preferably carried out in the presence of steam, at a temperature which is generally in the range 500° C. to 900° C., and followed by at least one acid attack using an aqueous solution of a mineral or organic acid as defined above. The conditions for calcining in the presence of steam (temperature, steam pressure and treatment period), also the post-calcining acid attack conditions (attack period, concentration of acid, nature of acid used and the ratio between the volume of the acid and the mass of zeolite) are adapted so as to obtain the desired level of dealumination. For the same reason, the number of heat treatment—acid attack cycles can be varied.

In a variation of this second method, the acid attack step, i.e., treatment using a solution of an acid, can be replaced by treatment with a solution of a chemical dealuminating compound such as those cited above, for example, namely silicon tetrachloride ($SiCl_4$), ammonium hexafluorosilicate [$(NH_4)_2SiF_6$], ethylenediaminetetra-acetic acid (EDTA), including its mono and disodium forms.

The framework dealumination cycle, comprising at least one heat treatment step, optionally and preferably carried out in the presence of steam, and at least one attack step carried out on the zeolite in an acid medium, can be repeated as often as is necessary to obtain the dealuminated zeolite having the desired characteristics. Similarly, following the heat treatment, optionally and preferably carried out in the presence of steam, a number of successive acid attacks can be carried out using different acid concentrations.

In a variation of this second calcining method, heat treatment of the zeolite containing the organic structuring agent can be carried out at a temperature which is generally in the range 500° C. to 850° C., optionally and preferably in the presence of steam. In this case, the steps of calcining the organic structuring agent and dealuminating the framework are carried out simultaneously. The zeolite is then optionally treated with at least one aqueous solution of a mineral acid (for example $HNO_3$ or HCl) or an organic acid (for example $CH_3CO_2H$). Finally, the solid obtained can optionally undergo at least one ion exchange step using at least one $NH_4NO_3$ solution, to eliminate practically all of the alkaline cations, in particular sodium, present in the cationic position in the zeolite.

Beta zeolites are advantageously used which are either entirely in the hydrogen form, or possibly partially exchanged with metal cations, for example cations of alkali metals or alkaline-earth metals and/or cations of rare earth metals with an atomic number of 57 to 71 inclusive ("Zeolite Molecular Sieves: Structure, Chemistry and Uses", D. W. Breck, J. Wiley & Sons, 1973). The cation/Al atomic ratio is less than 0.8, preferably less than 0.5 and more preferably less than 0.1.

Preferred beta zeolites have BET surface areas of more than 400 $m^2/g$, preferably in the range about 450 to 850 $m^2/g$.

The catalyst of the invention has a higher hydrocracking activity and selectivity than those of prior art catalytic formulae based on beta zeolite. Without wishing to be bound to a particular theory, it appears that this particularly high activity of the catalysts of the present invention is due to the acidity of the catalyst being reinforced by the presence of the promoter element (P, B, Si). In particular, the joint presence of boron and silicon on the matrix causes a very substantial improvement in the hydrocracking properties compared with catalysts in routine use. The improvement is also increased in the presence of a group VII B element.

The catalyst of the present invention generally comprises, in weight % with respect to the total catalyst weight:

0.1% to 60%, preferably 0.1% to 50%, more preferably 0.1% to 40%, of at least one hydro-dehydrogenating metal selected from group VIB and group VIII (the % being expressed as the % of oxide);

0.1% to 99%, preferably 0.1% to 98%, of at least one amorphous or low crystallinity porous mineral matrix (generally an oxide);

0.1 to 99.7%, advantageously 0.1% to 90%, preferably 0.1% to 80%, and still more preferably 0.1% to 60%, of a beta zeolite as defined above, and preferably dealuminated:

said catalyst further comprising:

0.1% to 20%, preferably 0.1% to 15%, more preferably 0.1% to 10%, of a promoter element selected from the group formed by boron, silicon and phosphorous (the % being expressed as the % of oxide); and optionally:

0 to 20%, preferably 0.1% to 15%, more preferably 0.1% to 10%, of at least one element selected from group VIIA (halogens), preferably fluorine;

0 to 20%, preferably 0.1% to 20% or 0.1% to 15%, more preferably 0.1% to 10%, of at least one element selected from group VIIB (the % being expressed as the % of oxide).

The croup VIB, group VIII and group VIIB metals in the catalyst of the present invention can be completely or partially present in the form of the metal and/or oxide and/or sulphide.

The hydrogenating function is ensured by at least one element from groups VIB or VIII. Molybdenum and tungsten are preferred group VIB elements.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate, ammonium heptamolybdate. ammonium tungstate, phosphomolybdic acid, phosphotungstic acid and their salts. Preferably, oxides and ammonium salts are used, such as ammonium molybdate, ammonium heptamolybdate and ammonium tungstate.

The catalyst of the present invention can comprise a group VIII metal such as iron, ruthenium, rhodium, palladium, osmium, iridium or platinum, and preferably cobalt or nickel. Advantageously, the following combinations of metals are used: nickel-molybdenum, cobalt-molybdenum, iron-molybdenum, iron-tungsten, nickel-tungsten, cobalt-tungsten. Preferred combinations are: nickel-molybdenum and nickel-tungsten. It is also possible to use combinations of three metals, for example nickel-cobalt-molybdenum.

The sources of the group VIII elements which can be used are well known to the skilled person. Examples are nitrates, sulphates, phosphates, halides. for example chlorides, bromides and fluorides, and carboxylates, for example acetates and carbonates.

The catalyst of the invention can comprise at least one group VIIB element such as manganese, technetium, or rhenium; manganese and rhenium are preferred.

Sources of the group VIIB element which can be used are well known to the skilled person. Preferably, ammonium salts, nitrates and chlorides are used.

The catalyst of the present invention thus also comprises at least one amorphous or low crystallinity porous mineral matrix, generally an oxide. Non limiting examples are aluminas, silicas, silica-aluminas. Aluminates can also be used. Preferably, matrices containing alumina in any of its forms which are known to the skilled person, preferably gamma alumina, are used.

Advantageously, mixtures of alumina and silica and mixtures of alumina and silica-alumina can also be used.

The promoter element (P, B, Si) is deposited on the catalyst. It has been introduced onto the support containing at least the zeolite and the matrix, and also preferably containing the hydrogenating metal or metals.

The promoter element, in particular silicon introduced onto the support of the invention, is principally located on the matrix of the support and can be characterized by techniques such as a Castaing microprobe (distribution profile of the various elements), transmission electron microscopy coupled with X ray analysis of the catalyst components, or by producing a distribution map of the elements present in the catalyst by electronic microprobe. These local analyses can furnish the location of the various elements, in particular that of the promoter element, in particular that of the amorphous silica on the support matrix due to introduction of the silicon promoter in accordance with the invention. The location of the silicon on the framework of the zeolite contained in the support is also revealed. Further, a quantitative estimate of the local silicon contents or other promoter elements can be carried out.

In addition, $^{29}Si$ NMR with magic angle spinning is a technique which can detect the presence of the amorphous silica introduced into the catalyst using the procedure described in the present invention.

The boron source can be boric acid, preferably orthoboric acid $H_3BO_3$, ammonium biborate or pentaborate, boron oxide, or boric esters. Boron can, for example, be introduced in the form of a mixture of boric acid, hydrogen peroxide and a basic organic compound containing nitrogen, such as ammonia, primary and secondary amines, cyclic amines, pyridine group compounds, quinolines, and pyrrole group compounds. Boron can, for example, be introduced using a solution of boric acid in a water/alcohol mixture.

The preferred phosphorous source is orthophosphoric acid $H_3PO_4$, but its salts and esters such as ammonium phosphates are also suitable. Phosphorous can, for example, be introduced in the form of a mixture of phosphoric acid and a basic organic compound containing nitrogen, such as ammonia, primary and secondary amines, cyclic amines, pyridine group compounds, quinolines, and pyrrole group compounds.

Molybdenum impregnation can be facilitated by adding phosphoric acid to ammonium paramolybdate solutions, which enables phosphorous to be introduced as well to promote the catalytic activity. Other phosphorous compounds can be used, as is well known to the skilled person.

A variety of silicon sources can be used. Examples are ethyl orthosilicate $Si(OEt)_4$, siloxanes, polysiloxanes, silicones, silicone emulsions and halogenated silicates such as ammonium fluorosilicate $(NH_4)_2SiF_6$ or sodium fluorosilicate $Na_2SiF_6$. Silicomolybdic acid and its salts, and silicotungstic acid and its salts can also advantageously be used. Silicon can be added, for example, by impregnating ethyl silicate in solution in a water/alcohol mixture. Silicon can be added, for example, by impregnation using an emulsion of a silicone in water.

The catalyst of the invention can also comprise at least one halogen, preferably fluorine.

Sources of group VIIA elements which can be used are well known to the skilled person. As an example, fluoride anions can be introduced in the form of hydrofluoric acid or its salts. Such salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate $(NH_4)_2SiF_6$, silicon tetrafluoride $SiF_4$ or sodium fluorosilicate $Na_2SiF_6$. Fluorine can be introduced, for example, by impregnating an aqueous hydrofluoride solution or ammonium fluoride.

The promoter element and optional element selected from group VIIA, the halogens, can be introduced by impregnation into the catalyst at various stages of the preparation and in various ways.

In general, a mixture is prepared containing at least one matrix, a beta zeolite, and optionally at least one hydrogenating metal selected from group VIII and group VIB metals. The mixture may be formed or not. It can optionally contain at least one group VIIB element.

The mixture (with at least one solution containing at least one promoter element and optionally a halogen) is preferably impregnated using the "dry" impregnation method which is well known to the skilled person. Impregnation can be carried out in a single step using a solution containing all of the constituent elements of the final catalyst, or by one or more impregnation operations, for example with an excess of solution, onto the calcined precursor.

When the catalyst contains boron, one preferred method of the invention consists of preparing an aqueous solution of at least one boron salt such as ammonium biborate or ammonium pentaborate in an alkaline medium and in the presence of hydrogen peroxide and carrying out dry impregnation, in which the pore volume of the precursor is filled with the solution containing boron.

When the catalyst contains silicon, a solution of a silicone type silicon compound is preferably used.

When the catalyst contains boron and silicon, boron and silicon can also be deposited simultaneously using a solution containing a boron salt and a silicone type silicon compound. Thus, for example (and in the preferred case where the precursor is a nickel-molybdenum type catalyst on a support containing a zeolite and an alumina), for example, it is possible to impregnate this precursor with an aqueous solution of ammonium biborate and Rhodorsil EIP silicone from Rhône Poulenc, to dry at 80° C., for example, then to impregnate with an ammonium fluoride solution, then dry at 80° C., for example, followed by calcining, preferably in air in a traversed bed, for example at 500° C. for 4 hours.

When the catalyst contains at least one group VIIA element, the mixture is impregnated with at least one solution of at least one element from group VIIA before, after or simultaneously with impregnation with a solution of the promoter element. It is possible, for example, to impregnate the catalyst with a solution of ammonium fluoride, to dry at 80° C., for example, then to calcine, preferably in air in a traversed bed, for example at 500° C. for 4 hours.

Other impregnation sequences can be carried out to obtain the catalyst of the present invention.

When the catalyst contains a deposited group VIIB element, the mixture is impregnated using at least one solution of at least one group VIIB element before, after or simultaneously with impregnation with the solution of the promoter element.

When the metals are introduced in a plurality of steps for impregnating the corresponding precursor salts, an intermediate drying step is generally carried out on the catalyst at a temperature generally in the range 60° C. to 250° C.; advantageously an intermediate calcining step is generally carried out on the catalyst at a temperature in the range 150° C. to 800° C., generally in the range 250° C. to 600° C.

Generally, in order to finish the catalyst preparation, the moist solid is left in a moist atmosphere at a temperature in the range 10° C. to 80° C., then the moist solid obtained is dried at a temperature in the range 60° C. to 150° C., and finally the solid obtained is calcined at a temperature in the range 150° C. to 800° C., generally in the range 250° C. to 600° C.

A preferred catalyst of the invention contains boron and silicon, and advantageously it also contains phosphorous. Preferably, it also contains nickel and molybdenum or cobalt and molybdenum, or nickel and tungsten.

Preferably, a NiMo or NiMoP catalyst on a support comprising a mixture of alumina and beta zeolite is impregnated with an aqueous boron solution then with an aqueous silicon solution (or the reverse, a silicon solution then a boron solution) or it is impregnated with an aqueous solution containing both boron and silicon.

It is thus possible to impregnate with the solution containing the silicon, to dry, calcine and impregnate with the solution containing boron, to dry and then carry out the final calcining step.

It is also possible to impregnate with the solution containing the boron, to dry, to calcine then impregnate with the solution containing the silicon, to dry and then carry out the final calcining step.

It is also possible to impregnate the precursor with a solution containing phosphorous, to dry then calcine, then impregnate the solid obtained with the solution containing the boron, to dry, calcine then impregnate with the solution containing the silicon, to dry and then carry out the final calcining step.

More particularly, a process for preparing the catalyst of the present invention comprises the following steps:
a) preparing a mixture hereinafter termed the precursor, comprising at least the following compounds: at least one amorphous or low crystallinity porous matrix, at least one beta zeolite with structure type BEA, at least one element from group VIB, and optionally at least one element from group VIII, optionally at least one element from group VIIB, and optionally phosphorous, the whole preferably being formed and dried;
b) impregnating the precursor defined in step a) with an aqueous solution containing boron and/or silicon, optionally phosphorous and optionally at least one group VIIA element; and advantageously the process is completed as follows:
c) leaving the moist solid in a moist atmosphere at a temperature in the range 10° C. to 80° C.;
d) drying the moist solid obtained in step b) at a temperature in the range 60° C. to 150° C.;
e) calcining the solid obtained from step c) at a temperature in the range 150° C. to 800° C.

Step b) above can be carried out using conventional methods known to the skilled person.

Step b) requires an aqueous solution containing boron and/or silicon to be deposited and thus is different from conventional methods for depositing B and/or Si which are known to the skilled person. One preferred method of the invention consists of preparing an aqueous solution of at least one boron salt such as ammonium biborate or ammonium pentaborate in an alkaline medium and in the presence of hydrogen peroxide and introducing a silicone type silicon compound into the solution and then dry impregnating, wherein the pore volume in the precursor is filled with the solution containing B and Si. This method of depositing B and Si is better than the conventional method using an alcoholic solution of boric acid or a solution of ethyl orthosilicate in alcohol.

The catalysts of the present invention are formed into grains of different shapes and dimensions. They are generally used in the form of cylindrical or polylobed extrudates such as bilobes, trilobes, or polylobes with a straight or twisted shape, but they can also be produced and used in the form of compressed powder, tablets, rings, beads or wheels. The specific surface area is measured by nitrogen adsorption using the BET method (Brunauer, Emmett, Teller, J. Am. Chem. Soc., vol. 60, 309–316 (1938)) and is in the range 50 to 600 m$^2$/g, the pore volume measured using a mercury porisimeter is in the range 0.2 to 1.5 cm$^3$/g and the pore size distribution may be unimodal, bimodal or polymodal.

The invention also concerns a process for converting hydrocarbon-containing feeds with the catalyst described above, and in particular processes for hydrocracking hydrocarbon-containing feeds.

The catalysts of the present invention are used for hydrocracking hydrocarbon feeds such as petroleum cuts. The feeds used in the process are gasolines, kerosines, gas oils, vacuum gas oils, atmospheric residues, vacuum residues, atmospheric distillates, vacuum distillates, heavy fuels, oils, waxes and paraffins, spent oil, deasphalted residues or crudes, feeds from thermal cracking (without hydrogen) or fluidised bed catalytic cracking processes (FCC), and their mixtures. They contain heteroatoms such as sulphur, oxygen and nitrogen and possibly metals.

The catalysts obtained are advantageously used for hydrocracking, in particular of vacuum distillate type heavy hydrocarbons, deasphalted residues or hydrotreated residues or the like. The heavy cuts are preferably constituted by at least 80% by volume of compounds with a boiling point of at least 350° C., preferably in the range 350° C. to 580° C. (i.e., corresponding to compounds containing at least 15 to 20 carbon atoms). They generally contain heteroatoms such as sulphur and nitrogen. The nitrogen content is usually in the range 1 to 5000 ppm by weight and the sulphur content is in the range 0.01% to 5% by weight.

The hydrocracking conditions such as temperature, pressure, hydrogen recycle ratio, and hourly space velocity, can vary widely depending on the nature of the feed, the quality of the desired products and the facilities available to the refiner. The temperature is generally over 200° C. and usually in the range 250° C. to 480° C. The pressure is over 0.1 MPa and usually over 1 MPa. The hydrogen recycle ratio is a minimum of 50 and usually in the range 80 to 5000 normal liters of hydrogen per liter of feed. The hourly space velocity is generally in the range 0.1 to 20 volumes of feed per volume of catalyst per hour.

The catalysts of the present invention preferably undergo sulphurisation to transform at least part of the metallic species to the sulphide before bringing them into contact with the feed to be treated. This activation treatment by sulphurisation is well known to the skilled person and can be carried out using any method already described in the literature.

One conventional sulphurisation method which is well known to the skilled person consists of heating in the presence of hydrogen sulphide to a temperature in the range 150° C. to 800° C. preferably in the range 250° C. to 600° C. generally in a traversed bed reaction zone.

The catalyst of the present invention can advantageously be used for hydrocracking vacuum distillate type cuts containing large quantities of sulphur and nitrogen.

In a first implementation, or partial hydrocracking, also known as mild hydrocracking, the degree of conversion is below 55%. The catalyst of the invention is thus used at a temperature which is generally 230° C. or more, preferably 300° C., generally at most 480° C., and usually in the range 350° C. to 450° C. The pressure is generally over 2 MPa and preferably 3 MPa, less than 12 MPa and preferably less than 10 MPa. The quantity of hydrogen is a minimum of 100 normal liters of hydrogen per liter of feed and usually in the range 200 to 3000 normal liters of hydrogen per liter of feed. The hourly space velocity is generally in the range 0.1 to 10 h$^{-1}$. Under these conditions, the catalysts of the present invention have better activities for conversion, hydrodesulphuration and hydrodenitrogenation than commercially available catalysts.

In a second implementation, the catalyst of the present invention can be used or partial hydrocracking, advantageously under moderate hydrogen pressure conditions, of cuts such as vacuum distillates containing high sulphur and nitrogen contents which have already been hydrotreated. In this hydrocracking mode, the degree of conversion is below 55%. In this case, the petroleum cut is converted in two steps, the catalysts of the invention being used in the second step. The catalyst of the first step has a hydrotreatment function and comprises a matrix, preferably alumina-based, preferably containing no zeolite, and at least one metal with a hydrogenating function. Said matrix is selected from the group formed by alumina, silica, silica-alumina, magnesia, zirconia, titanium oxide and aluminates. The hydrotreatment function is ensured by at least one metal or compound of a metal from group VIII, such as nickel or cobalt. A combination of at least one metal or compound of a metal from Croup VI of the periodic table (in particular molybdenum or tungsten) and at least one metal or compound of a metal from group VIII (in particular cobalt or nickel) can be used. The total concentration of groups VI and VIII metal oxides is preferably in the range 5% to 40% by weight, most preferably in the range 7% to 30% by weight, and the weight ratio, expressed as the metal oxide of the group VI metal (or metals) to that of the group VIII metal (or metals) is in the range 1.25 to 20, preferably in the range 2 to 10. Further, this catalyst can contain phosphorous. The phosphorous content, expressed as the concentration of phosphorous pentoxide $P_2O_5$, is generally at most 15%, preferably in the range 0.1% to 15% by weight, and more preferably in the range 0.15% to 10% by weight. It can also contain boron in a ratio B/P=1.05–2 (atomic), the sum of the B and P contents, expressed as the oxides, being 5% to 15% by weight.

The first step is generally carried out at a temperature of 350–460° C., preferably 360–450° C.; the pressure is at least 2 MPa, preferably at least 3 MPa; and the hourly space velocity is 0.1–5 $h^{-1}$, preferably 0.2–2 $h^{-1}$, with a quantity of hydrogen at least 100 Nl/Nl of feed. preferably 260–3000 Nl/Nl of feed.

In the second implementation, in the conversion step using the catalyst of the invention (or second step), the temperatures are generally 230° C. or more and usually in the range 300° C. to 430° C. The pressure is generally at least 2 MPa, preferably at least 3 MPa, it is less than 12 MPa and preferably less than 10 MPa. The quantity of hydrogen is a minimum of 100 l/l of feed and usually in the range 200 to 3000 l/l of feed. The hourly space velocity is generally in the range 0.15 to 10 $h^{-1}$. Under these conditions, the catalysts of the present invention have better activities for conversion, hydrodesulphuration, and hydrodenitrogenation and a better selectivity for middle distillates than commercially available catalysts. The service life of the catalysts is also improved in the moderate pressure range.

In a further implementation, the catalyst of the present invention can be used for hydrocracking under high hydrogen pressure conditions of at least 5 MPa, preferably at least 10 MPa, and advantageously at least 12 MPa. The treated cuts are, for example, vacuum distillates containing high sulphur and nitrogen contents which have already been hydrotreated. In this hydrocracking mode, the degree of conversion is over 55%. In this case, the petroleum cut conversion process is carried out in two steps, the catalyst of the invention being used in the second step.

The catalyst for the first step is identical to that described above and used under the described conditions, the pressure being adjusted to that of this other implementation.

For the conversion step using the catalyst of the invention (or second step), the temperatures are generally 230° C. or more, usually in the range 300° C. to 430° C. The quantity of hydrogen is a minimum of 100 l/l of feed, usually in the range 200 to 3000 l/l of hydrogen per liter of feed. The hourly space velocity is generally in the range 0.15 to 10 $h^{-1}$.

Under these conditions, the catalysts of the present invention have better activities for conversion and better selectivity than commercially available catalysts, even with considerably lower zeolite contents than those of commercially available catalysts.

The following examples illustrate the present invention without in any way limiting its scope.

EXAMPLE 1
Preparation of a Support Containing a Beta Zeolite

Large quantities of a hydrocracking catalyst support containing a beta zeolite were produced so as to enable different catalysts based on the same support to be prepared. To this end, 18.9% by weight of a beta zeolite was used which had a total Si/Al ratio (measured by X ray fluorescence) of 23.1, an atomic ratio measured by atomic adsorption of Na/Al= 0.003, a BET surface area of 720 $m^2$/g and a pore volume of 0.298 ml of liquid nitrogen/g (at the temperature of liquid nitrogen) at $P/P_0$=0.14, which was mixed with 81.1% by weight of a matrix composed of ultrafine tabular boehmite or alumina gel sold by Condea Chemie GmbH under the trade name SB3. This powder mixture was then mixed with an aqueous solution containing 66% nitric acid (7% by weight of acid per gram of dry gel) then milled for 15 minutes. After milling, the paste obtained was passed through a die with cylindrical orifices with a diameter of 1.4 mm. The extrudates were dried overnight at 120° C. then calcined at 550° C. for 2 hours in moist air containing 7.5% by volume of water. Cylindrical extrudates 1.2 mm in diameter were obtained with a specific surface area of 286 $m^2$/g, a pore volume of 0.39 $cm^3$/g and a monomodal pore size distribution centred on 11 nm. An X ray diffraction analysis of the matrix revealed that it was composed of low crystallinity cubic gamma alumina with beta zeolite.

EXAMPLE 2
Preparation of Hydrocracking Catalysts Containing a Beta Zeolite

Extrudates of the support containing a beta zeolite prepared in Example 1 were dry impregnated with an aqueous solution of a mixture of ammonium heptamolybdate and nickel nitrate, dried overnight at 120° C. in air and finally calcined at 550° C. in air. The oxide weight contents of catalyst CZ4 obtained are shown in Table 1.

We impregnated a sample of catalyst CZ4 with an aqueous solution comprising ammonium biborate so as to deposit about 1.7% by weight of $B_2O_3$. After ageing at room temperature in a saturated water atmosphere, the impregnated extrudates were dried overnight at 120° C. then calcined at 550° C. for 2 hours in dry air. Catalyst CZ4B was obtained: NiMo/alumina-beta doped with boron. A catalyst CZ4Si was obtained using the same procedure as that for CZ4B above, replacing the boron precursor in the impregnation solution with an emulsion of Rhodorsil EP1 silicone. For this catalyst, a quantity of about 1.6% by weight of $SIO_2$ was to be deposited.

Extrudates of the support containing a beta zeolite prepared in Example 1 were dry impregnated with an aqueous solution of a mixture of ammonium heptamolybdate, nickel nitrate and orthophosphoric acid, dried overnight at 120° C. in air and finally calcined at 550° C. in air. Catalyst CZ4P was obtained.

We impregnated a sample of catalyst CZ4P with an aqueous solution comprising ammonium biborate so as to deposit about 1.7% by weight of $B_2O_3$. After ageing at room temperature in an atmosphere saturated with water, the impregnated extrudates were dried overnight at 120° C. then calcined at 550° C. for 2 hours in dry air. Catalyst CZ4PB was obtained: NiMo/alumina-beta doped with boron. A catalyst CZ4PSi was obtained using the same procedure as that for CZ4PB above, replacing the boron precursor in the impregnation solution with an emulsion of Rhodorsil EP1 silicone. For this catalyst, a quantity of about 1.5% by weight of $SiO_2$ was to be deposited. Finally, a catalyst CZ4PBSi was obtained using the same procedure as for the above catalysts but using an aqueous solution comprising ammonium biborate and a Rhodorsil EP1 silicone emulsion and employing the same operating conditions. Fluorine was then added to this catalyst by impregnating with a solution of dilute hydrofluoric acid to deposit about 1% by weight of fluorine. After drying overnight at 120° C. and calcining at 550° C. for 2 hours in dry air, catalyst CZ4PBSiF was obtained. The final oxide contents of catalysts CZ4 are shown in Table 1.

TABLE 1

Characteristics of CZ4 catalysts

| Catalyst | CZ4 | CZ4 P | CZ4 Si | CZ4 B | CZ4 PB | CZ4 PSi | CZ4 PBSi | CZ4 PBSiF |
|---|---|---|---|---|---|---|---|---|
| $MoO_3$ (wt %) | 14.2 | 13.6 | 13.9 | 13.9 | 13.4 | 13.4 | 13.2 | 13.1 |
| NiO (wt %) | 3.5 | 3.4 | 3.4 | 3.4 | 3.3 | 3.3 | 3.3 | 3.2 |
| $P_2O_5$ (wt %) | 0 | 4.2 | 0 | 0 | 4.1 | 4.1 | 4.1 | 4.0 |
| $B_2O_3$ (wt %) | 0 | 0 | 0 | 1.85 | 1.7 | 0 | 1.7 | 1.6 |
| $SiO_2$ (wt %) | 15.0 | 14.3 | 16.3 | 14.6 | 14.0 | 15.9 | 15.2 | 15.1 |
| F (wt %) | 0 | 0 | 0 | 0 | 0 | 0 | 0 | 0.95 |
| Complement to 100%, mainly composed of $Al_2O_3$ (wt %) | 67.3 | 64.5 | 66.3 | 66.1 | 63.5 | 63.3 | 62.5 | 62.05 |
| Beta zeolite (wt %) | 15.5 | 14.9 | 15.3 | 15.3 | 14.6 | 14.7 | 14.4 | 14.3 |

Catalyst CZ4P was then impregnated with an aqueous solution comprising manganese nitrate to deposit about 1.4% by weight of $MnO_2$. After ageing at room temperature in an atmosphere saturated with water, the impregnated extrudates were dried overnight at 120° C. then calcined at 550° C. for 2 hours in dry air. Catalyst CZ4PMn was obtained. This catalyst was then impregnated with an aqueous solution comprising ammonium biborate and Rhodorsil EP1 silicone emulsion (Rhone-Poulenc) to deposit about 1.9% by weight of $B_2O_3$ and 1.9% by weight of $SiO_2$. The impregnated extrudates were dried overnight at 120° C. then calcined at 550° C. for 2 hours in dry air to produce catalyst CZ4PMnBSi. Fluorine was then added to this catalyst by impregnating with a solution of dilute hydrofluoric acid to deposit about 1% by weight of fluorine. After drying overnight at 120° C. and calcinin at 550° C. for 2 hours in dry air, catalyst CZ4PMnBSiF was obtained. The oxide contents of these catalysts are shown in Table 2.

TABLE 2

Characteristics of CZ4 catalysts containing manganese

| Catalyst | CZ4 PMn | CZ4 PMnBSi | CZ4 PMnBSiF |
|---|---|---|---|
| $MoO_3$ (wt %) | 13.4 | 12.9 | 12.8 |
| NiO (wt %) | 3.3 | 3.2 | 3.2 |
| $MnO_2$ (wt %) | 1.3 | 1.3 | 1.2 |
| $P_2O_5$ (wt %) | 4.2 | 4.0 | 4.0 |
| $B_2O_3$ (wt %) | 0 | 1.9 | 1.8 |
| $SiO_2$ (wt %) | 14.1 | 15.3 | 15.1 |
| F (wt %) | 0 | 0 | 1.15 |
| Complement to 100%, mainly composed of $Al_2O_3$ (wt %) | 63.7 | 61.4 | 61.9 |
| Beta zeolite (wt %) | 14.7 | 14.2 | 14.0 |

Electronic microprobe analysis of catalysts CZ4PSi, CZ4PBSi. CZ4PBSiF (Table 1) and catalysts CZ4PMnBSi, CZ4PMnBSiF (Table 2) showed that the silicon added to the catalyst of the invention was principally located on the matrix and was in the form of amorphous silica.

EXAMPLE 3

Comparison of Catalysts for Partial Conversion Hydrocracking of a Vacuum Gas Oil The catalysts prepared in the above Examples were employed under moderate pressure hydrocracking conditions using a petroleum feed with the following principal characteristics:

| | |
|---|---|
| Density (20/4) | 0.921 |
| Sulphur (weight %) | 2.46 |
| Nitrogen (ppm by weight) | 1130 |
| Simulated distillation | |
| Initial point | 365° C. |
| 10% point | 430° C. |
| 50% point | 472° C. |
| 90% point | 504° C. |
| End point | 539° C. |
| Pour point | +39° C. |

The catalytic test unit comprised two fixed bed reactors in upflow mode. The catalyst for the first hydrotreatment step of the process, HTH548 from Procatalyse, comprising a group VI element and a group VIII element deposited on alumina, was introduced into the first reactor, through which the feed passed first. A hydrocracking catalyst as described above was introduced into the second reactor, through which the feed passed last. 40 ml of catalyst was introduced into each of the reactors. The two reactors operated at the same temperature and the same pressure. The operating conditions of the test unit were as follows:

| | |
|---|---|
| Total pressure | 5 MPa |
| Hydrotreatment catalyst | 40 $cm^3$ |
| Hydrocracking catalyst | 40 $cm^3$ |
| Temperature | 400° C. |
| Hydrogen flow rate | 20 l/h |
| Feed flow rate | 40 $cm^3$/h |

The two catalysts underwent in-situ sulphurisation before the reaction. It should be noted that any in-situ or ex-situ sulphurisation method is suitable. Once sulphurisation had been carried out, the feed described above could be transformed.

The catalytic performances are expressed as the gross conversion at 400° C. (GC), the gross selectivity for middle distillates (GS) and the hydrodesulphuration (HDS) and hydrodenitrogenation (HDN) conversions. These catalytic performances were measured for the catalyst after a stabilisation period, generally of at least 48 hours, had passed.

The gross conversion GC is taken to be:

$GC$=weight % of 380° $C.^{minius}$ of effluent.

380° $C.^{minus}$ represents the fraction distilled at a temperature of 380° C. or less.

The gross selectivity GS for middle distillates is taken to be:

$GS=100*$ weight of (150° C.–380° C.) fraction/weight of 380° C.$^{minus}$ fraction of effluent.

The hydrodesulphuration conversion HDS is taken to be:

$HDS=(S_{initial}-S_{effluent})/S_{initial}*100=(24600-S_{effluent})/24600*100$

The hydrodenitrogenation conversion HDN is taken to be:

$HDN=(N_{initial}-N_{effluent})/N_{initial}*100=(1130-N_{effluent})/1130*100$

Table 3 below shows the gross conversion GC at 400° C., the gross selectivity GS, the hydrodesulphuration conversion HDS and the hydrodenitrogenation conversion HDN for the four catalysts.

TABLE 3

Catalytic activities of catalysts for partial hydrocracking at 400° C.

| | | GC (wt %) | GS (%) | HDS (%) | HDN (%) |
|---|---|---|---|---|---|
| CZ4 | NiMo/beta | 50.0 | 65.0 | 98.95 | 96.1 |
| CZ4P | NiMoP/beta | 50.2 | 65.0 | 99.21 | 96.9 |
| CZ4B | NiMoB/beta | 50.3 | 65.2 | 99.1 | 96.7 |
| CZ4Si | NiMoSi/beta | 50.4 | 65.0 | 99.15 | 96.9 |
| CZ4PB | NiMoPB/beta | 50.4 | 64.0 | 99.25 | 97.7 |
| CZ4PSi | NiMoPSi/beta | 50.4 | 64.5 | 99.35 | 98.4 |
| CZ4PBSi | NiMoPBSi/beta | 50.9 | 64.1 | 99.52 | 98.9 |

The results of Table 3 show that combining dopants B and/or Si improves the performances of the catalyst for conversion, with a tolerable reduction in the cross selectivity for middle distillates.

Further, the results of Table 3 show that it is particularly advantageous to introduce silicon to a precursor already containing group VIB and/or VIII elements and possibly at least one of elements P, B and F.

The beta zeolite-based catalysts of the invention containing a promoter element improve the performances of the hydrocracking catalysts, and those containing phosphorous and boron and/or silicon are thus of particular interest in partial hydrocracking of a vacuum distillate type feed containing nitrogen, in particular at a moderate hydrogen pressure.

EXAMPLE 4
Comparison of Catalysts for High Conversion Hydrocracking of a Vacuum Gas Oil The catalysts prepared as described above were used under high conversion (60–100%) hydrocracking conditions. The petroleum feed was a hydrotreated vacuum distillate with the following principal characteristics:

| | |
|---|---|
| Density (20/4) | 0.869 |
| Sulphur (ppm by weight) | 502 |
| Nitrogen (ppm by weight) | 10 |
| Simulated distillation | |
| Initial point | 298° C. |
| 10% point | 369° C. |
| 50% point | 427° C. |
| 90% point | 481° C. |
| End point | 538° C. |

This feed had been obtained by hydrotreatment of a vacuum distillate using a HR360 catalyst from Procatalyse comprising a group VIB element and a group VIII element deposited on alumina.

0.6% by weight of aniline and 2% by weight of dimethyldisulphide were added to the feed to simulate the partial pressures of $H_2S$ and $NH_3$ present in the second hydrocracking step. The prepared feed was injected into the hydrocracking test unit which comprised one fixed bed reactor in upflow mode, into which 80 ml of catalyst had been introduced. The catalyst was sulphurised using a n-hexane/DMDS+ aniline mixture at 320° C. It should be noted that any in-situ or ex-situ sulphurisation method is suitable. Once sulphurisation had been carried out, the feed described above could be transformed. The operating conditions of the test unit were as follows:

| | |
|---|---|
| Total pressure | 9 MPa |
| Catalyst | 80 cm³ |
| Temperature | 360–420° C. |
| Hydrogen flow rate | 80 l/h |
| Feed flow rate | 80 cm³/h |

The catalytic performances are expressed as the temperature at which a gross conversion of 70% is produced and by the gross selectivity for 150–380° C. middle distillates. These catalytic performances were measured for the catalyst after a stabilisation period, generally of at least 48 hours, had passed.

The gross conversion GC is taken to be:

$GC$=weight % of 380° C.$^{minus}$ of effluent.

The gross selectivity GS for middle distillates is taken to be:

$GS=100$ weight of (150° C.–380° C.) fraction/weight of 380° C.$^{minus}$ fraction of effluent.

The reaction temperature was fixed so as to obtain a gross conversion GC of 70% by weight. Table 4 below shows the reaction temperature and gross selectivity for the catalysts described above.

TABLE 4

Catalytic activities of catalysts for high conversion hydrocracking (70%)

| | | T (° C.) | GS (%) |
|---|---|---|---|
| CZ4 | NiMo/beta | 369 | 51.2 |
| CZ4P | NiMoP/beta | 369 | 51.5 |
| CZ4PB | NiMoPB/beta | 367 | 52.1 |
| CZ4PSi | NiMoPSi/beta | 367 | 52.4 |
| CZ4PBSi | NiMoPBSi/beta | 366 | 53.5 |
| CZ4PBSiF | NiMoPBSiF/beta | 365 | 54.8 |
| CZ4PMn | NiMoPMn/beta | 367 | 53.2 |
| CZ4PMnBSi | NiMoPMnBSi/beta | 366 | 54.1 |
| CZ4PMnBSiF | NiMoPMnBSiF/beta | 364 | 55.2 |

Adding boron and/or silicon to the catalyst containing a beta zeolite and the hydro-dehydrogenating element improved the conversion activity, meaning a reduction in the reaction temperature necessary to attain 70% of conversion, and the gross selectivity for middle distillates was better.

Adding the promoter element to the catalyst containing the beta zeolite improved the conversion activity, resulting in a reduction in the reaction temperature necessary to attain 70% conversion, and the gross selectivity for middle distillates was better. Further, if manganese was added, an improvement in the converting activity was also observed with a substantial improvement in the cross selectivity for middle distillates. These improvements were even greater in the presence of fluorine. The importance of combining phosphorous with boron and/or silicon should be noted. Without wishing to be bound to any particular theory, this effect could be attributed to a hydrogenating function enhanced by the promoter element or elements possibly in the presence of Mn and/or F.

The catalysts of the invention are thus of particular interest for high conversion hydrocracking of a vacuum distillate type feed, in particular at a moderate hydrogen pressure.

EXAMPLE 5

As support is prepared as in example I but with a dealuminated beta zeolite having a Si/Al atomic ratio of 42 and obtained by direct attack with 1N nitric acid, 10 ml/g of zeolite and refluxing for 4 hours, of a beta zeolite synthetised with a Si/Al ratio of 15.3.

The obtained dealuminaed zeolite is washed then used for preparing extrudates as in example 1 with the same proportions.

On the support are deposited phosphorus, boron and silicon as in example 2 and in the same quantities, and the product obtained is treated as in example 2.

A catalyst CZ4'PBSi is obtained.

It undergoes the test of example 4.

For 70% conversion, the temperature is 369° C. and the selectivity of 54.0% wt.

It appears that the catalyst based on dealuminated beta zeolite shows the best performances.

What is claimed is:

1. A catalyst comprising at least one halogen, at least one matrix, a beta zeolite, at least one hydro-dehydrogenating metal, and at least one promoter element, said promoter element being selected from the group consisting of boron and silicon, and said promoter element being deposited on the matrix of the catalyst.

2. A catalyst according to claim 1, wherein the beta zeolite is dealuminated.

3. A catalyst according to claim 2, wherein the beta zeolite has an Si/Al ratio of 10 to 100.

4. A catalyst according to claim 2, wherein the beta zeolite has an Si/Al ratio of 20 to 70.

5. A catalyst according to claim 1, further comprising at least one group VIIB metal.

6. A catalyst according to claim 1 comprising, in weight % with respect to the total catalyst weight:

- 0.1% to 60% (expressed as the % by weight of oxide) of at least one hydro-dehydrogenating metal selected from the group formed by group VIB and VIII metals;
- 0.1% to 99% of at least one amorphous or low crystallinity porous matrix;
- 0.1% to 99.7% of beta zeolite;
- 0.1% to 20% (expressed as the % by weight of oxide) of at least one promoter element selected from the group formed by boron or silicon;
- 0.1% to 20% of at least one halogen;
- 0 to 20% (expressed as the % by weight of oxide) of at least one group VIIB element.

7. A catalyst according to claim 1, further comprising phosphorous.

8. A catalyst according to claim 1 wherein the matrix is selected from the group consisting of alumina and silica-alumina, silica aluminates.

9. A catalyst according to claim 1, wherein the halogen is fluorine.

10. A catalyst according to claim 1, wherein the hydro-dehydrogenating metal is selected from nickel-molybdenum, nickel-tungsten, cobalt-molybdenum, cobalt-tungsten and nickel-cobalt-molybdenum.

11. A catalyst according to claim 1, wherein the beta zeolite has an Si/Al ratio of 10 to 200.

12. A process for converting hydrocarbons comprising contacting said hydrocarbons with a catalyst according to claim 1.

13. A process according to claim 12 wherein said converting occurs by hydrocracking.

14. A process according to claim 13, carried out at at least 200° C., at a pressure of more than 0.1 MPa, with a hydrogen recycle ratio of at least 50 and at an hourly space velocity of 0.1–20 $h^{-1}$.

15. A process according to claim 13, carried out at a temperature of at least 230° C., at a pressure of more than 2 MPa and less than 12 MPa, with an hourly space velocity of 0.1–10 $h^{-1}$ and with a quantity of hydrogen of at least 100 Nl/l of feed, such that the degree of conversion is less than 55%.

16. A process according to claim 13 carried out at a temperature of at least 230° C., at a pressure of at least 5 MPa, with an hourly space velocity of 0.15–10 $h^{-1}$ and with a quantity of hydrogen of at least 100Nl/l of feed, such that the degree of conversion is 55% or more.

17. A process according to claim 13, carried out on a hydrocarbon-containing feed selected from gasolines, kerosines, gas oils, vacuum gas oils, atmospheric residues, vacuum residues, atmospheric distillates, vacuum distillates, heavy fuels, oils, waxes, paraffins, spent oil, deasphalted residues, and deasphalted crude oil.

18. A catalyst comprising manganese, at least one matrix, a beta zeolite, at least one hydro-dehydrogenating metal, and at least one promoter element, said promoter element being selected from the group consisting of boron and silicon, and said promoter element being deposited on the matrix of the catalyst.

19. A process for preparing a catalyst comprising at least one matrix, and a beta zeolite wherein the mixture is impregnated with at least one solution of at least one group VIIA element before, after or simultaneously with impregnation of a solution of at least one promoter element selected from boron, silicon and phosphorous.

20. A preparation process according to claim 19, wherein the mixture is impregnated with at least one solution of at least one group VIIB element before, after or simultaneously with impregnation with the solution of the promoter element.

21. A preparation process according to claim 19, wherein the mixture also contains group VIIB element(s).

22. A preparation process according to claim 19, wherein the mixture also contains phosphorous and is impregnated with at least one solution containing boron and by at least one solution containing silicon.

23. A process for preparing a catalyst according to claim 19, wherein the hydro-dehydrogenating metal is selected from group VIII and group VIB metals.

* * * * *

UNITED STATES PATENT AND TRADEMARK OFFICE
CERTIFICATE OF CORRECTION

PATENT NO. : 6,524,470 B1
DATED : February 25, 2003
INVENTOR(S) : Slavik Kasztelan et al.

It is certified that error appears in the above-identified patent and that said Letters Patent is hereby corrected as shown below:

Column 16,
Line 3, reads "silica aluminates." should read -- silica, aluminates. --

Signed and Sealed this

First Day of June, 2004

JON W. DUDAS
*Acting Director of the United States Patent and Trademark Office*